United States Patent [19]

Takahashi

[11] Patent Number: 5,247,164

[45] Date of Patent: Sep. 21, 1993

[54] IC CARD AND PORTABLE TERMINAL

[75] Inventor: Takehiro Takahashi, Toride, Japan

[73] Assignee: Hitachi Maxell, Ltd., Osaka, Japan

[21] Appl. No.: 953,299

[22] Filed: Sep. 30, 1992

Related U.S. Application Data

[63] Continuation of Ser. No. 468,879, Jan. 23, 1990, abandoned.

[30] Foreign Application Priority Data

Jan. 26, 1989 [JP] Japan .................................. 1-17099
Jan. 26, 1989 [JP] Japan .................................. 1-17100
Feb. 21, 1989 [JP] Japan .................................. 1-41205

[51] Int. Cl.$^5$ .............................................. G06K 5/00
[52] U.S. Cl. .................................. 235/492; 235/380; 365/227
[58] Field of Search ........... 235/380, 441, 492, 487; 364/200, 900; 365/227

[56] References Cited

U.S. PATENT DOCUMENTS

| | | | |
|---|---|---|---|
| 4,480,178 | 10/1984 | Miller et al. | 235/380 |
| 4,523,087 | 6/1985 | Benton | 235/380 |
| 4,523,297 | 6/1985 | Ugon et al. | 235/380 |
| 4,575,621 | 3/1986 | Dreifus | 235/380 |
| 4,605,844 | 8/1986 | Haggan | 235/380 |
| 4,650,981 | 3/1987 | Foletta | 235/492 |
| 4,674,618 | 6/1987 | Eglise et al. | 235/381 |
| 4,698,748 | 10/1987 | Juzswik et al. | 364/200 |
| 4,748,320 | 5/1988 | Yorimoto et al. | 235/380 |
| 4,794,236 | 12/1988 | Kawana et al. | 235/441 |
| 4,795,898 | 1/1989 | Bernstein et al. | 235/380 |
| 4,803,351 | 2/1989 | Shigenaga | 235/380 |
| 4,812,634 | 3/1989 | Ohta et al. | 235/487 |
| 4,814,591 | 3/1989 | Nara et al. | 235/380 |
| 4,816,654 | 3/1989 | Anderl et al. | 235/492 |
| 4,817,135 | 3/1989 | Winebaum | 379/216 |
| 4,827,111 | 5/1989 | Kondo | 235/492 |
| 4,829,166 | 5/1989 | Froelich | 235/492 |
| 4,839,916 | 6/1989 | Fields et al. | 379/13 |
| 4,948,954 | 8/1990 | Dias | 235/492 |
| 5,032,708 | 7/1991 | Comerford et al. | 235/492 |
| 5,041,464 | 8/1991 | Cole et al. | 364/200 |
| 5,083,122 | 1/1992 | Clark | 361/172 |

OTHER PUBLICATIONS

"Hitachi Microcomputer Engineering Company User's Manual" pp. 33-34 and 158-159 (date unknown).

Primary Examiner—Eugene R. LaRoche
Assistant Examiner—Christopher R. Glembocki

[57] ABSTRACT

An IC card which operates at either one of an operation mode and a power save mode, the processing in the operation mode being carried out in accordance with a command signal inputted from a predetermined external equipment, and the power save mode being capable of terminating its operation and returning to the operation mode upon reception of a predetermined release signal. The IC card includes an information processing circuit and a release signal generating circuit for outputting the predetermined release signal to the information processing circuit within the IC card at the time when the command signal from the external equipment is received. The information processing circuit executes the process corresponding to the command signal received from the external equipment during the operation mode, and thereafter causes the IC card to enter to the power save mode. A portable terminal for directing initiation of the power save mode operation of the IC card includes a clock signal generating circuit capable of generating a clock signal having a lower frequency than the rated clock frequency of the IC card and an interface capable of data transfer relative to the IC card at a data transmission rate in proportion to a ratio of the lower frequency of the clock signal generated by the clock signal generating circuit to the rated clock signal frequency.

24 Claims, 13 Drawing Sheets

IC CARD AND PORTABLE TERMINAL

This application is a continuation of application Ser. No. 07/468,879 filed on Jan. 23, 1990, now abandoned.

BACKGROUND OF THE INVENTION

The present invention relates to an IC card and its portable terminal, and more particularly to an IC card with less power consumption and a portable terminal capable of controlling the power consumption of the IC card.

The data transfer sequence between a conventional IC card and an external equipment is as follows. Namely, an IC card is loaded into external equipment including a host computer, IC card reader, and terminal equipment (hereinafter these external equipment are collectively called a terminal). A command sent from the terminal is decoded in accordance with an internal control program of the IC card. In accordance with the decoded contents, the memory is accessed for data write, read, or erase operations. The accessed results are sent back to the terminal as a response to the command. In such operations, the terminal is always a master, whereas the IC card is a slave which waits for a command from the terminal.

Such a conventional IC card has a power consumption of about 50 mW for the one chip IC built-in type and about 210 mW for the two chip IC built-in type. This power consumption is relatively large as compared with that of a portable calculator which consumes about 0.3 to 15 mW.

Recently, an IC card is required to have various operation functions for allowing various applications such as banks, hospitals, credits and the like. In order to satisfy various requirements, an IC card has now been used while loading it to a portable terminal.

SUMMARY OF THE INVENTION

A portable terminal such as a handy terminal used with an IC card has an IC card connector and a relatively large capacity battery, resulting in a weighty handy terminal. The weight of the battery is an obstacle against reducing the weight of the handy terminal. Further, if a rechargeable battery is used, the number of charging times increases as the power consumption of an IC card increases.

An IC card is generally powered from a terminal to which it is mounted. With a large power consumption, the amount of heat generation at the IC card becomes large. It is desirable from the above view points that the power consumption of an IC card be as small as possible.

The present invention aims at solving the above-described prior art problems and providing an IC card with less power consumption capable of operating for a long period even if a small capacity battery, for example, is used.

According to the structure of the IC card of this invention, the IC card operates alternately in a normal operation mode for executing a command and in a power save mode for reducing power consumption during periods of waiting for the next command after the execution of the preceding command.

According to one aspect of the present invention, there is provided an IC card which operates in either an operation mode or a sleep mode, the processing in the operation mode being carried out in accordance with a command signal inputted from a predetermined external equipment, and the sleep mode being capable of terminating its operation and returning to the operation mode upon reception of a predetermined release signal, the IC card including an information processing circuit provided in the IC card; and a release signal generating circuit for outputting the release signal to the information processing circuit within the IC circuit at the time when the command signal from the external equipment is received; wherein the information processing circuit executes the process corresponding to the command signal received from the external equipment during the operation mode, and thereafter causes the IC card to change to the sleep mode.

During operation of the IC card, in response to a key operation at a terminal to which the IC card is loaded, a command transferred from the terminal is decoded to execute a process corresponding to the command. In this case, the IC card takes a command waiting state prior to the reception thereof. The process execution time of the IC card is very short as compared with the command waiting time. The power consumed during the command waiting time is therefore not negligible and the average power consumption can be reduced by reducing such power. It can be thought of that the power supply to the IC card is caused to stop during the command waiting state under the control of the terminal. In this case, however, pass word coincidence flag information or the like stored in a RAM of the IC card is lost so that the normal processing by the IC card cannot be ensured.

In view of the above, this invention provides the structure of the IC card as described above. With this IC card, after executing a process corresponding to a command, an information processing circuit such as an MPU enters into the sleep mode to suppress or stop its own power consumption. The data in a RAM built in an IC card can be retained even during the sleep mode. In this case, an interface to the external equipment and other circuits are maintained active so that the next command can be received. The sleep mode of the MPU can be released, e.g., by supplying an interruption signal to the interruption terminal of the MPU built in the IC card.

During the sleep mode, the power consumption of the MPU is about one fifth that during the normal operation mode. Further, during the sleep mode, although the operation of the MPU is stopped, the function of the peripheral circuits such as a RAM, SCI (serial communication interface) and the like continues to be active. Accordingly the information in the RAM is not lost. The sleep mode can be easily released upon reception of a command message at the SCI.

While an IC card is loaded to an external equipment such as a terminal, the MPU can remain in the sleep mode until the next command is received. During the sleep mode, the power consumption of the MPU is suppressed or stopped so that the total average consumption power of the IC card can be reduced.

According to a second aspect of the present invention, there is provided an IC card which operates in either an operation mode or a standby mode, the processing in the operation mode being carried out in accordance with a command signal inputted from an external equipment, and the standby mode being capable of suppressing or stopping power consumption by the circuit built in the IC card, the IC card operating such that said standby mode is initiated after executing the process corresponding to the command signal from the external equipment, and the operation mode is initiated in response to a standby release signal sent from the external equipment.

With this structure, the IC card enters into the standby mode after executing a process corresponding to a command, to thereby suppress or stop the power consumption by the circuit built in the IC card. In executing the next command from the terminal, the terminal sends a standby release signal to the IC card. For example, the terminal sends a reset signal to the reset terminal of the MPU built in the IC card. The IC card is caused to enter into the normal operation mode so that the next command can be decoded to allow the execution of the corresponding process. For an IC card with a built-in RAM, the backup of the RAM is made to continue even during the standby mode.

With the above-described arrangement, while an IC card is loaded to an external equipment such as a terminal, the MPU can remain in the standby mode until the next command is received. During the standby mode, the power consumption of the MPU and its peripheral circuit is suppressed or stopped so that the total average consumption power of the IC card can be reduced.

For the case where a plurality of consecutive commands are to be processed by the IC card, it is possible for the terminal to send to the IC card, after all the processes for the commands have been executed, a command instructing the IC card to enter into the standby mode. By doing so, the power consumption of the IC card can be reduced. It is also possible that the command message of each command includes the information instructing the IC card to automatically enter into the standby mode after executing the command.

According to the present invention, there is further provided a portable terminal of a battery driven type which performs data transfer relative to an IC card connectable to the portable terminal by supplying to the IC card the operating power thereof and sending to the IC card a command signal for the execution of a predetermined process, the portable terminal comprising: a clock signal generating circuit capable of generating a clock signal having a lower frequency than the rated clock frequency of the IC card; and an interface capable of data transfer relative to the IC card at the data transmission rate in proportion to a ratio of the lower frequency of the clock signal generated by the clock signal generating circuit to the rated clock signal frequency.

The current consumption of a microprocessor built in an IC card increases proportionally as the clock frequency becomes high. It is possible to lower the clock frequency in order to reduce the consumption current. However, since the data transmission/reception is carried out on the basis of the clock frequency, data transfer between the IC card and the handy terminal cannot be performed at the rated data transmission rate.

Data transfer becomes possible if the data transmission rate is lowered to (rated data transmission rate)×(supplied clock frequency)/(rated clock frequency).

With the above construction, the clock frequency supplied to the IC card is lowered to thereby reduce the power consumption. In this case, however, the processing speed of the IC card is lowered so that if a great number of data are to be transferred relative to the IC card for data read/write operation, it takes a longer time. In order to reduce the consumption current without lowering the processing speed, there is provided a clock generator for generating a plurality of clock frequencies including the rated clock frequency, lower frequency, and further lower frequency. While the IC card executes a particular process, it is operated at the rated frequency or a slightly lower frequency to thereby suppress the lowering of the processing speed.

It is possible to operate the IC card at the substantially lowered clock frequency during the command waiting state to thereby lower the consumption of power, and at the frequency near the rated clock frequency during the execution of a particular process to thereby suppress the lowering of the processing speed.

As described previously, the command waiting time of the IC card is longer than the command processing time. Therefore, as described previously, a substantially lowered clock frequency is used during the command waiting time so that the average consumption current can be reduced greatly. In this case, there is no fear of losing the information in the RAM of the IC card, which might have occurred when the supply power to the IC card is stopped to suppress the power consumption. In addition, during the command waiting time, clocks may not be supplied to the extent that LSIs in the IC card maintain their normal operation, to thereby reduce the power consumption.

Some LSI in the IC card has an oscillator for generating the operation sequence of write/erase operations of an erasable and nonvolatile memory (e.g., EEPROM). This oscillator generally operates independently from the clock supplied to the IC card. During the data write/erase operations of such an EEPROM, the internal control program of the IC card runs in synchronization with the operation sequence by the oscillator, whereas the control program for the internally stored write/erase control program itself runs at the rated clock frequency supplied externally to the IC card. Consequently, if the clock frequency lowers, the data write/erase operations of the EEPROM becomes impossible.

In order to ensure the normal data write/erase operations of the EEPROM and reduce the consumption current, the rated frequency clock is supplied to the IC card having a built-in EEPROM only during the data write/erase operation, and a lower frequency clock than the rated frequency clock is supplied during the other operations, to thereby reduce the consumption power.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS the present invention will become more fully understood from the detailed description given hereinbelow and the accompanying drawings which are given by way of illustration only, and thus, are not limitative of the present invention and wherein.

DESCRIPTION OF THE PREFERRED EMBODIMENTS

An embodiment shown in FIGS. 1 to 3 will be described which realizes the power save mode in the form of a sleep mode.

Figure 1:
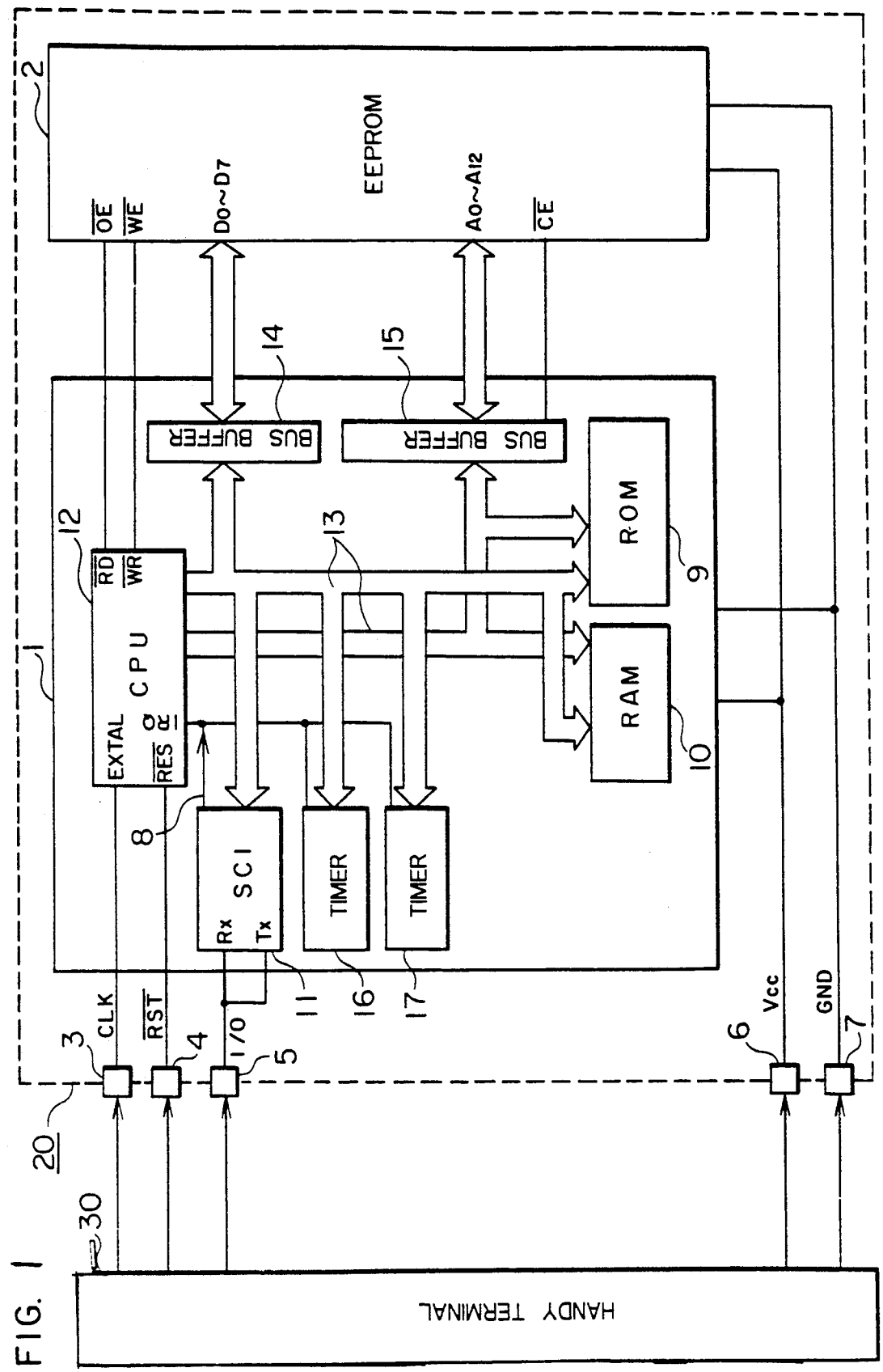
FIG. 1 is a block diagram showing the IC card according to an embodiment of this invention.
Figure 2:
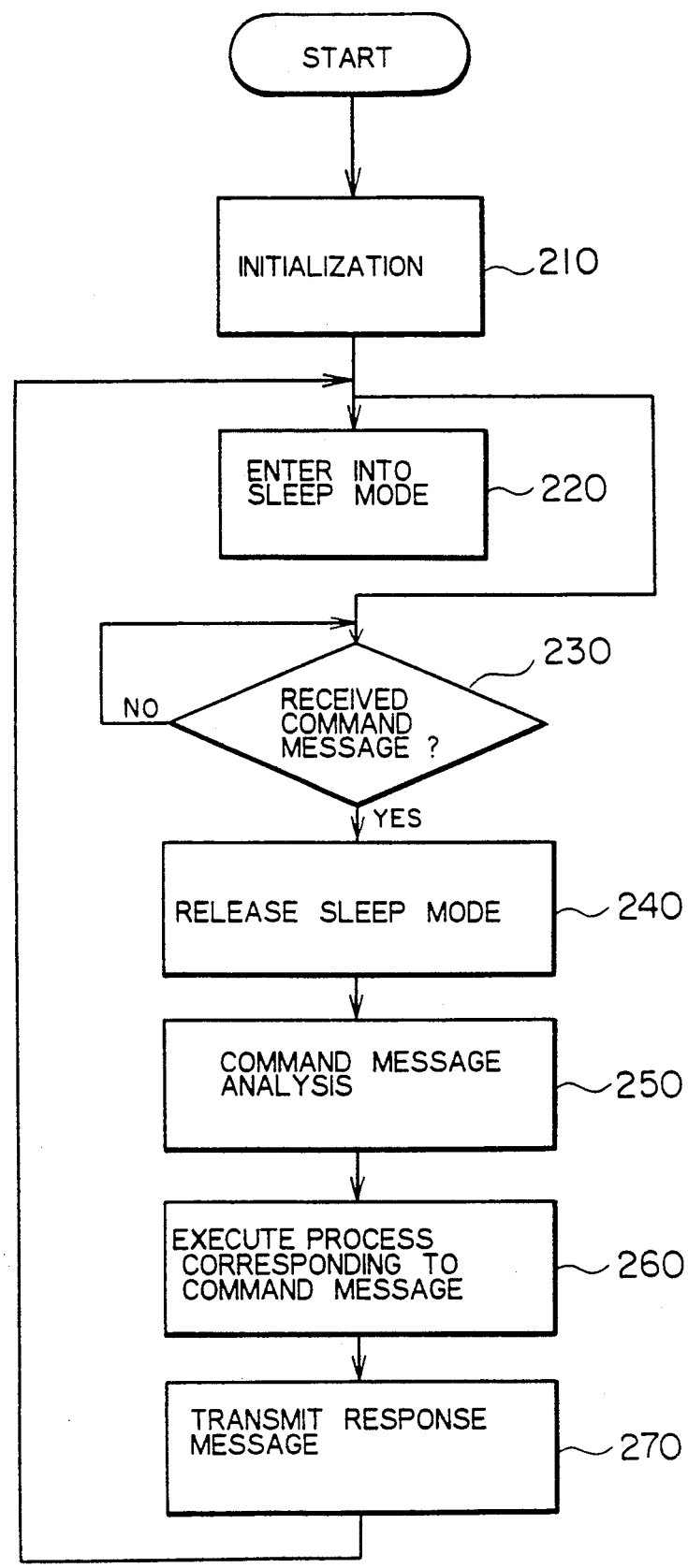
FIG. 2 is a flow chart illustrating the operation of the IC card shown in FIG. 1.

As shown in FIG. 1, an IC card 20 has therein an MPU 1 and EEPROM 2 and is provided with contact terminals for interconnection with a handy terminal 30, the terminals including a clock terminal (CLK) 3, reset terminal ($\overline{RST}$) 4, I/O terminal 5 for the input/output of serial data, Vcc terminal 6 for the reception of power from an external supply, and GND terminal 7.

MPU 1 is provided with a central processing unit (CPU) 12, serial communication interface (SCI) 11 for the transfer of signals between the handy terminal 30, RAM 10, ROM (mask ROM) 9, and other components. These circuit components are interconnected to each other via a bus 13 and transfer data relative to EEPROM 2 via bus buffers 14 and 15. Timer circuits 16 and 17 are used for supervising program running-away and other timings.

The circuit arrangement of this embodiment constructed as above is not limited thereto, but other combinations of circuit components and the number of IC chips may be optionally selected. Namely, various hardware circuits such as gate arrays or other logical circuits and the like may be added or partially replaced with the above-described circuit components. Further, MPU 1 may not include therein SCI 11 and timer circuits 16 and 17.

Stored in ROM 9 within MPU 1 are basic programs for executing data read/write, confirmation information (pass word and the like) check, specific program start, communication control, and the like. CPU 12 is adapted to be set either at a normal operation mode for operation in response to a command from the handy terminal 30 or at a sleep mode for suppressing or stopping its own power consumption. CPU 12 is initialized when the power is turned on, and then it enters into the sleep mode. When an interruption signal is received from SCI 11, the sleep mode is changed to the normal operation mode.

The operation mode is initiated when the IC card 20 receives a command from the handy terminal 30 and thereafter it executes the job designated by the command. During the operation mode, all components in the IC card 20 are made active and operable in a normal operation condition and the power supplied from the handy terminal 30 is consumed at the predetermined operating level. On the other hand, the sleep mode is initiated, for example, after a command inputted from the handy terminal 30 has been executed, and takes the state that CPU 12 within MPU 1 stops operating while the function of other peripheral components is controlled so as not to be stopped. Namely, the operation of the timers 16 and 17 and SCI 11 in the embodied circuit arrangement are maintained continued. Accordingly, even during the sleep mode, SCI 11 can receive the data inputted via the I/O terminal 5 and can set the data in a received data register (not shown) to thereby generate an interruption signal. In this condition, although the operation of CPU 12 stops as described above, the contents of registers within CPU 12 are retained while making the consumption power as small as about one fifth the normal operation power.

The sleep mode is initiated after executing a sleep command following the execution of a particular command, and thereafter CPU 12 is directed to be in a sleep state. To this end, a program for entering into the sleep mode after the execution of a command is stored, e.g., in ROM 9 (or in EEPROM 2).

SCI 11 and CPU 12 are interconnected by an interruption signal line 8. Upon reception of a command message from the handy terminal, SCI 11 sends an interruption signal to CPU 12 via the line 8 to make CPU 12 release the sleep state.

The above operation will be described with reference to the block diagram shown in FIG. 1 and the flow chart shown in FIG. 2. CPU 12 within MPU 1 starts operating when power is supplied upon application of a supply voltage Vcc at the Vcc terminal from the handy terminal 30, clock signals are applied to a clock terminal 3 and when a reset signal ($\overline{RST}$) at the reset terminal 4 is released from its low level ("L") to high level("H"). CPU 12 then executes at step 210 an initialization process in accordance with a program stored in ROM 9, and thereafter the flow advances to steps 220 and 230. At step 220, a sleep command is generated to execute the processes for entering into the sleep mode. At step 230, SCI 11 is controlled so as to enter into a command message waiting loop. When a command message is inputted to the I/O terminal 5 from the handy terminal 30, SCI 11 sends an interruption signal to CPU 12 via the signal line 8.

Upon reception of the interruption signal from SCI 11, CPU 12 releases the sleep state at step 240. At step 250, a command in the command message received from SCI 11 is analyzed. The processes corresponding to the command are executed at step 260. After transmitting a response message via SCI 11 at step 270, the flow returns to steps 220 and 230 whereat the sleep command is again executed to enter into the sleep state, and into the command message waiting loop by controlling SCI 11.

CPU 12 and peripheral circuits at the command waiting state can thus be entered into the sleep mode, to thereby reduce power consumption.

After the initialization or after the execution of a command, CPU 12 executes a sleep command to enter into the sleep state and stops its operation. In this case, the information in RAM 10 is retained and the operation of SCI 11 is maintained continued. EEPROM 2 together with CPU 12 may be made inactive (or of a standby state) after executing the sleep command.

The timer circuits 16 and 17 supply to SCI 11 clocks which define the baud rate of SCI 11. During the sleep state, it is sufficient that one of the timer circuits continues to operate.

The above operations are repeated until the IC card 20 is removed from the handy terminal and the source voltage Vcc at the terminal 6 switches off. Power consumption by CPU 12 and peripheral circuits at the command waiting state can thus be partially reduced.

Power consumption of EEPROM 2 during non-operation is considerably low compared to power consumption of CPU 12. The execution time by the IC card 20 is considerably short as compared with the command waiting time so that the average consumption current by the IC card 20 can also be made about one fifth.

With the above-described circuit arrangement, it is unnecessary to make any particular external manipulation for the switching the IC card into the sleep mode. The IC card can therefore be handled in quite the same manner as conventionally, while allowing a long term operation of the IC card with a small capacity battery, and allowing particularly the reduction in weight and size of the handy terminal.

Figure 3:
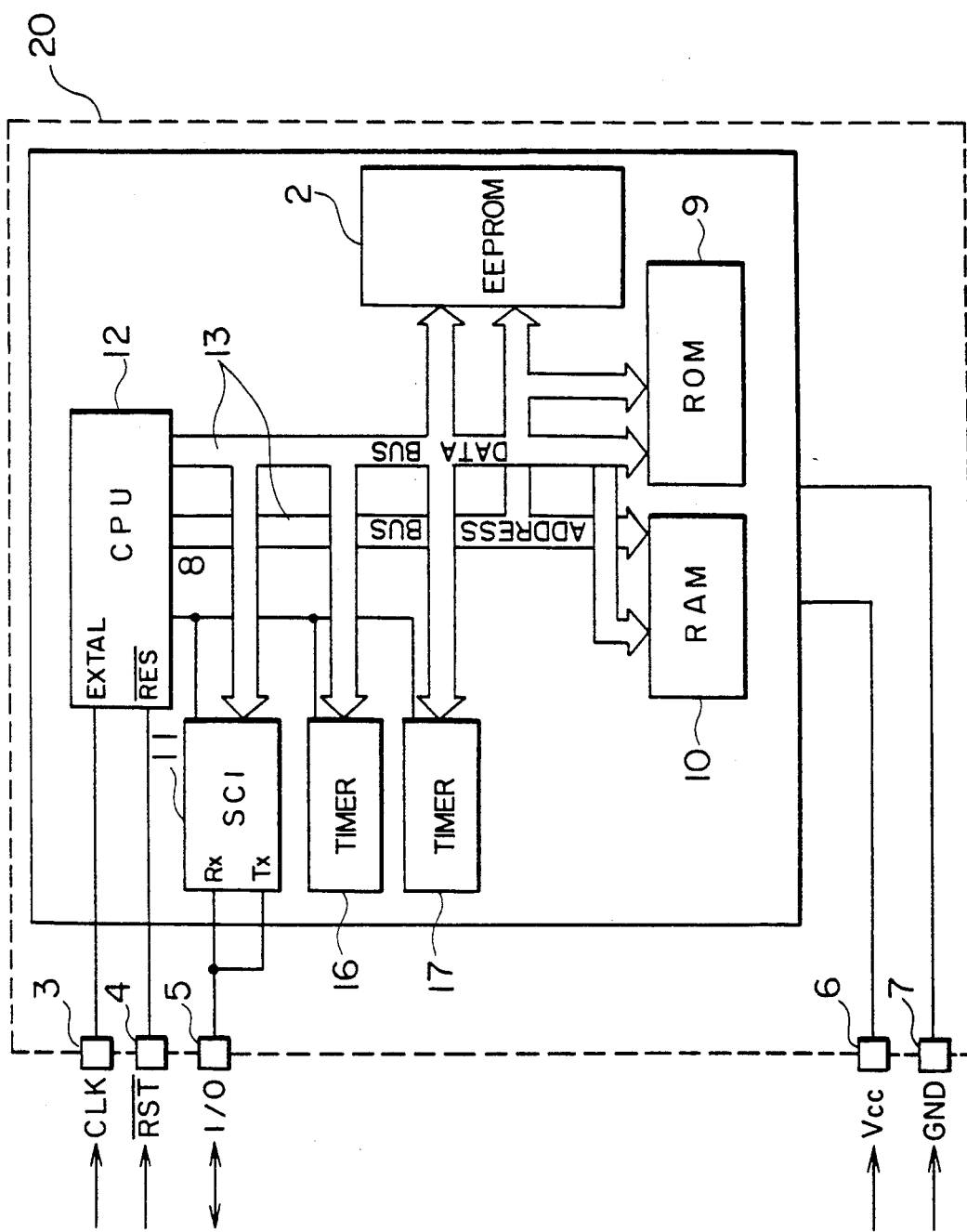
FIG. 3 is a block diagram showing the IC card modified from that shown in FIG. 1.

FIG. 3 shows a modification of the IC card shown in FIG. 1 of this invention, wherein EEPROM 2 is included within MPU 1. This modification operates in the same manner as the first embodiment while obtaining the similar advantageous effects.

In the above-described embodiment, the interruption signal may be generated not by SCI 11 but by any other circuit which is constructed such that the interruption signal is generated upon reception of a signal from the external equipment. Further, instead of the interruption signal, a release signal may be used which releases the sleep mode of the information processing circuit such as CPU 12. SCI 1 and the like circuits may include therefore a release signal generator for generating such a release signal.

Furthermore, in the above embodiment, a handy terminal has been described by way of example. It is obvious that this invention is applicable to other external equipments such as various other terminals, and host computers.

According to the above embodiment, the information processing circuit such as CPU 12 is entered into the sleep mode during waiting for a command, so that the average consumption current of the IC card can be considerably reduced, to thereby allow a long term operation of the IC card with a small capacity battery or the like.

Another embodiment shown in FIGS. 4 to 9 will be described which realizes the power save mode in the form of a standby mode.

Figure 4:
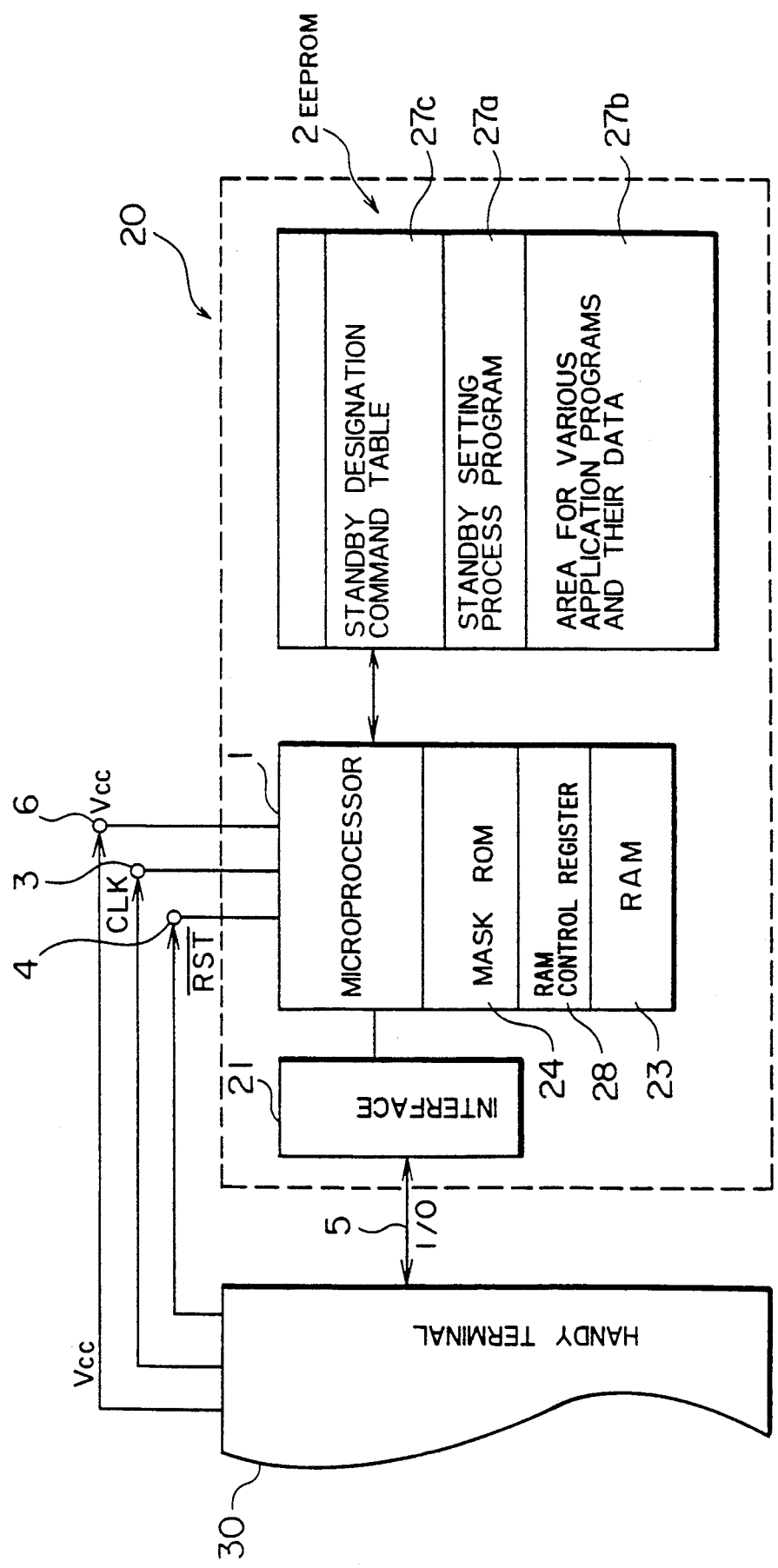
FIG. 4 is a block diagram showing the IC card according to another embodiment of this invention.

As shown in FIG. 4, an IC card 20 has therein an interface 21 for the transfer of data between a handy terminal 30, RAM 23, mask ROM 24, RAM control register 28, EEPROM 2 for the storage of data and/or programs, and MPU 1 which controls the above-mentioned components connected thereto via a bus and the like. MPU 1 is provided with a power source terminal Vcc 6 for the reception of power from the handy terminal, reset terminal ($\overline{RST}$) 4 for the reception of a reset signal, clock terminal (CLK) 3 for the reception of a clock signal, an I/O line 5 for the data transfer, and the like.

The circuit arrangement of this embodiment constructed as above is not limited thereto, but other combinations of circuit components and the number of IC chips may be optionally selected. Namely, various hardware circuits such as gate arrays or other logical circuits and the like may be added or partially replaced with the above-described circuit components.

Figure 5:
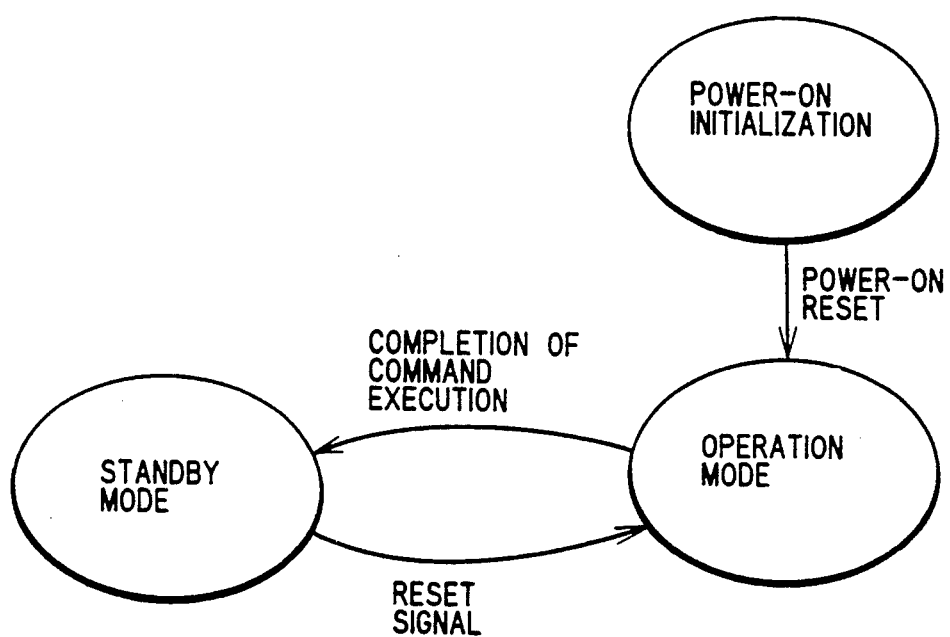
FIG. 5 is a transition chart showing the transition of operations of the IC card shown in FIG. 4.

Stored in ROM 24 within MPU 1 are basic programs for executing data read/write, confirmation information (pass word and the like) check, specific program start, communication control, and the like. As shown in FIG. 5, MPU 1 is adapted to be set either in a normal operation mode for the operation in response to a command from the handy terminal 30 or in a standby mode for suppressing or stopping the power consumption of the built-in circuits. MPU 1 is initialized when the power is turned on, and then it enters into the normal operation mode. When a reset signal is received at the reset terminal 4 from the handy terminal 30, the standby mode is changed to the normal operation mode.

During the standby mode, the operation of MPU 1, mask ROM 24, RAM control register 28 and interface 21 is stopped. However, RAM 23 is maintained to be active with power being supplied thereto, so that the contents thereof are retained. The embodiment shown in FIG. 4 does not use the timers shown in FIG. 1. If such timers are used, the operation thereof is also stopped. As a result, if the standby mode is to be released, it is necessary, as will be described later in detail, to execute a process such as supplying a reset signal from the handy terminal 30. Nevertheless, power consumption can be reduced more than the case of the sleep mode described with the first embodiment shown in FIGS. 1 to 3, because the operation of MPU 1 and its associated circuits are all stopped.

The standby mode is initiated after executing processes for a particular command. To this end, a standby setting program 27a is stored in EEPROM 2 by means of down-loading for example. This program 27a may be previously stored in the mask ROM.

The standby setting program 27a is executed upon actuation by MPU 1 after executing predetermined processes. With the standby setting program 27a, the IC card 20 enters into the standby mode from the normal operation mode to be set at the standby state.

There are stored also in EEPROM 2 (or mask ROM 24) a standby designation command table 27c, and a set of application programs 27b and their data. The standby designation command table 27c is used for the case shown in FIG. 8. The application programs 27b are provided for processing various data such as the work attendance, over-time work, and holidays regarding a company, and other data.

There are stored in the RAM control register 28 a standby power bit (STBY PWR) indicative of the start operation after release of power-on reset, a RAM enable bit indicative of whether RAM 23 can be accessed or not, and flags including a standby flag for the control of switching to the standby mode and other flags. Each flag is constructed of one bit.

The operation of the embodiment shown in FIG. 4 will be described with reference to FIG. 6. When the IC card 20 is connected to the handy terminal 30, when power source (Vcc), clock signal (CLK) and the like are applied, and when the supplied reset signal ($\overline{RST}$) is released (refer to FIG. 7), the program stored in the mask ROM 24 is activated to start processing. In this case, the IC card has received a reset signal upon turning-on of power so that it follows the power-on reset operation. After the power-on reset, an ordinary operation is carried out which starts from the predetermined address of the program for the ordinary operation. This operation is also carried out from the same start address when the standby mode to be described later returns to the normal operation mode.

Figure 6:
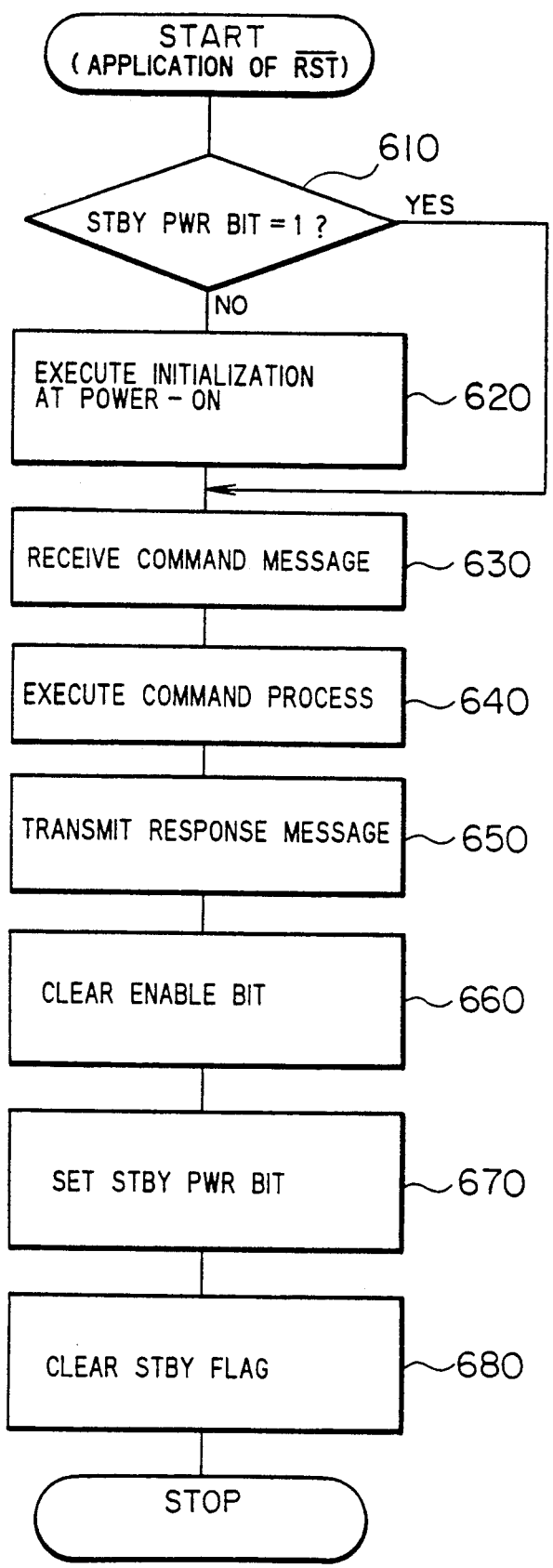
FIG. 6 is a flow chart illustrating the operation of the IC card shown in FIG. 4.
Figure 7:
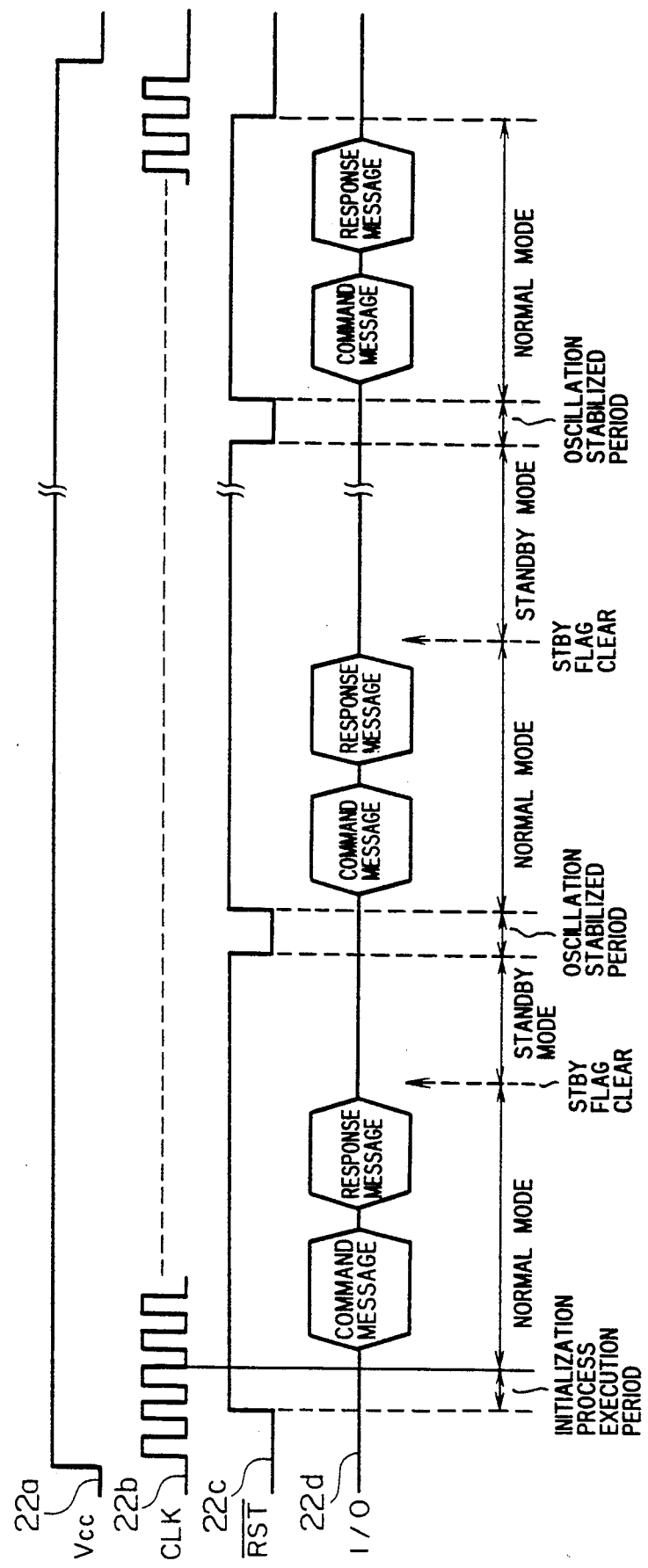
FIG. 7 is a timing chart showing the output waveforms of the IC card shown in FIG. 4.

As shown in FIGS. 6 and 7, upon a reset ($\overline{RST}$) start, the predetermined program in the IC card starts running, and MPU 1 judges whether it is a release of a power-on reset or of a reset-after-operation, to thereafter perform an associated process. This judgement process is indicated at step 610 in FIG. 6 wherein the standby power bit (STBY PWR bit) in the RAM control register 28 is referred to whether it is "1" or not.

This standby power bit is a bit indicative of the backup state of the power for RAM 23. Once this bit is set, it is remained unchanged during the application period of Vcc, whereas if Vcc is turned off, it is cleared.

Upon reference to the standby bit in the RAM control resister 28 at step 610, the standby power bit is still at the cleared state because this step is executed immediately after the power-on reset, i.e., the power was first turned on after its off-state. The judgement at step 610 therefore indicates a "NO" state so that flow advances to step 620 whereat MPU 1 of the IC card 20 enters into the normal operation mode after executing a power-on initialization process as shown in FIG. 6. At step 630, a command waiting state is initiated to wait for a command from the handy terminal 30. When a command is received by MPU 1 from the handy terminal 30, it is decoded at step 640 to execute the associated process. Thereafter, at step 650, a response message is returned to the handy terminal 30. The timings of the above operations are shown in FIG. 7.

Next, the standby setting program 27a is caused to run in order to enter into the standby mode. First, at step 660, the RAM enable bit in the RAM control register 28 is cleared to "0". When this bit is cleared, RAM 23 built in the IC card 20 is disabled and not allowed to be accessed so that the data stored in RAM 23 can be protected during the standby mode.

At step 670 after clearing the enable bit, the standby power bit (STBY PWR bit) is set at "1", and at step 680 the standby flag (STBY flag) is cleared to "0" to thereby terminate the processes. At this time, MPU 1 in the IC card 20 enters into the standby mode to take the standby state. The timings of the above operations are shown in FIG. 7.

In this condition, when a reset signal ($\overline{RST}$ signal) is applied from the handy terminal 30 to the reset terminal, the IC card 20 judges at step 610 if the standby bit in the RAM control register 28 is "1" or not. In this case, the standby bit is "1" so that a "YES" state is satisfied and the flow advances to step 630 whereat the normal operation mode is established immediately. Thereafter, the above-described processes such as reception of a command message are executed at steps 630 to 680 to again enter into the standby mode.

In the above processes, since the flow returns from the standby mode with the standby power bit being set, MPU 1 judges this condition so that the flow advances to step 630 without executing the initialization process at step 620. At step 630 the flow enters into the command waiting state. When a command is received from the handy terminal 30, it is executed and thereafter the response message is returned to the handy terminal 30. The standby setting program 27a is again activated to enter into the standby mode and take the standby state. The above operations are repeated until Vcc is stopped from being supplied from the handy terminal 30 as shown in FIG. 7.

In the above operations, it is to be noted that even during the standby mode, power is being supplied to RAM 23 so that the data thereof can be retained.

With the above-described arrangement, the standby mode can be entered after the execution of a command without entering into the command waiting state, so that during the period until the next command is received, power consumption by the IC card 20 can be reduced.

It is therefore possible to reduce the power consumption during the command waiting period as small as about one fortieth that of the conventional IC card. For the case of an IC card constructed of two chips, power is consumed more or less by MPU 1 and EEPROM 2. In this case, however, the power consumption by EEPROM 2 during the standby state is extremely small so that it can be reduced to substantially the same degree as that constructed of one chip.

Figure 8:
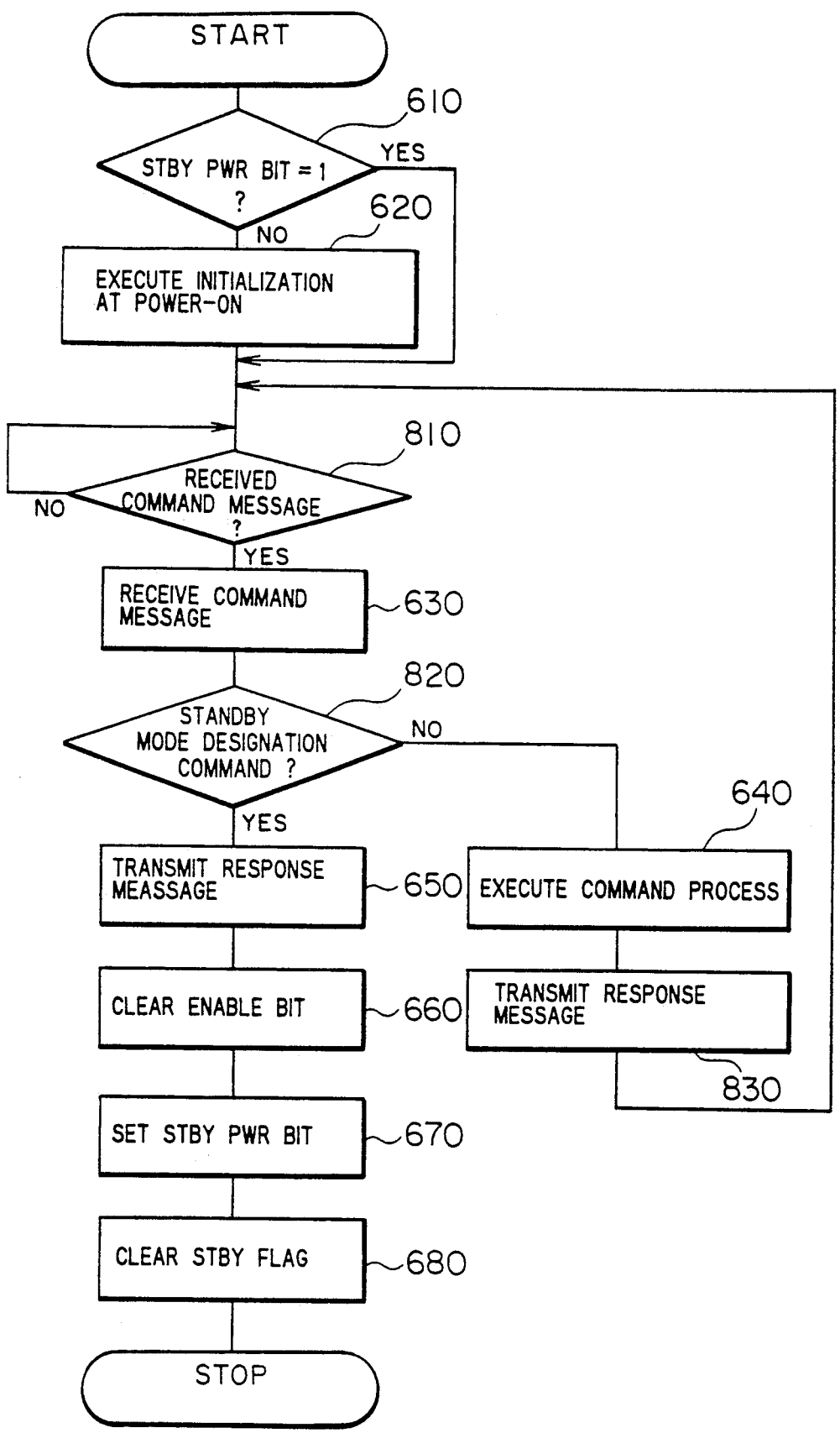
FIGS. 8 and 9 are flow charts showing the modified operations of the IC card shown in FIG. 4.

FIG. 8 illustrates a modification of the embodiment shown in FIG. 6 wherein the IC card 20 enters into the standby mode upon reception of a standby command. In the flow chart shown in FIG. 8, there are provided a command waiting loop step 810 between steps 620 and 630 shown in FIG. 6, and a judgement step 820 between steps 630 and 640 for judging if a received command is a standby designation command or not.

If the judgement result at step 820 indicates a "YES" state, i.e., if the received command is the standby designation command, the processes after step 650 as shown in FIG. 6 are executed. On the other hand, if the judgement result indicates a "NO" state, i.e., if the received command is other than the standby designation command, the flow advances to step 640 to execute the received command and thereafter, at step 830, a response message is transmitted to then return to step 810.

The judgement process for the standby designation command at step 820 is performed in such a manner that the standby designation command table 27c in EEPROM 2 of the IC card 20 shown in FIG. 4 is searched to refer to the flag regarding the command stored in the table, to thereby judge if the command is for the standby designation command. This table may store only the command designating to enter into the standby mode.

In this embodiment shown in FIG. 8 different from that of FIG. 6, a command message designating to enter into the standby mode is provided so that this mode is effected only upon reception of this command message.

With such an arrangement, it is unnecessary for the handy terminal 30 to supply a reset signal to the IC card each time a command is sent thereto. The IC card 20 can be set at the standby mode at any time desired by sending the standby command thereto. It is possible to reduce the number of application times of the reset signal which is otherwise supplied from the handy terminal 30 to the IC card 20 at each command, thus reducing the burden on the handy terminal 30.

The standby command is generated and delivered in accordance with the IC card processing program stored in the handy terminal 30, the standby command being generally delivered in the form of a plurality of consecutive commands.

Figure 9:
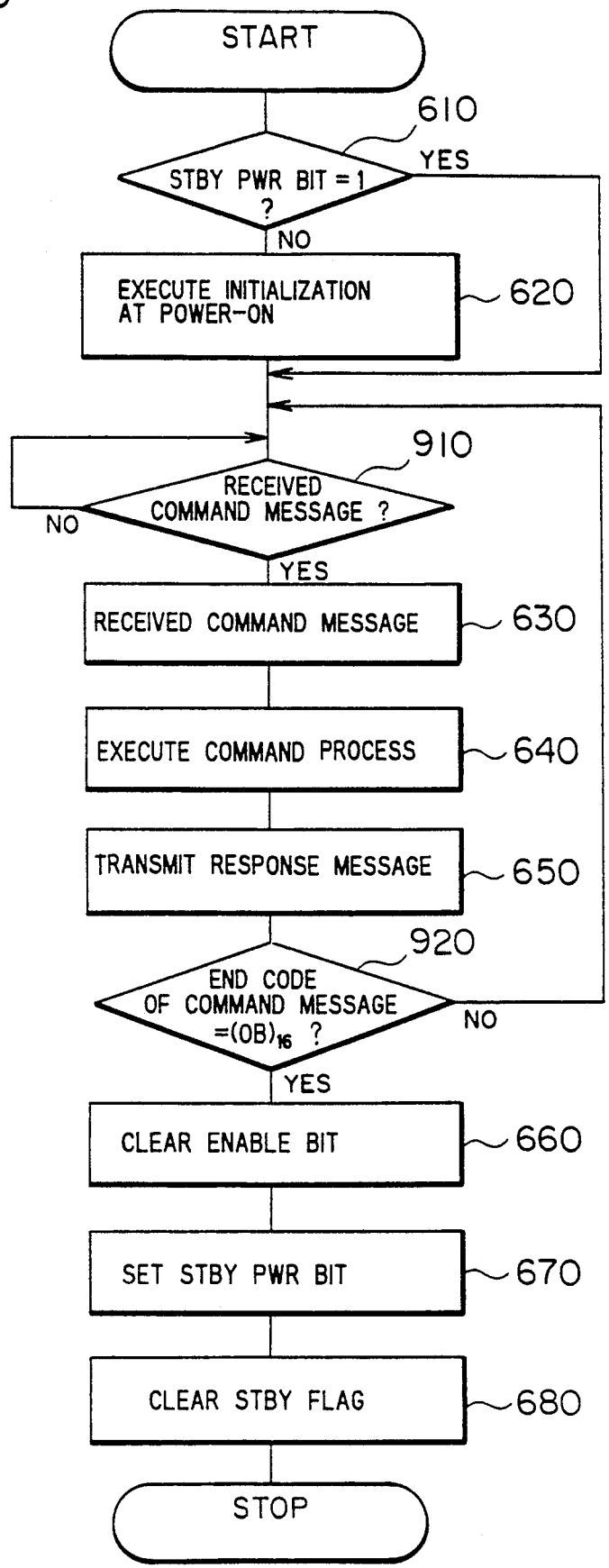

In the flow chart shown in FIG. 9, there are provided a command waiting loop step 910 between steps 620 and 630 shown in FIG. 6, and a judgement step 920 between steps 650 and 660 for judging if the received command is the last one in accordance with the information accompanied by the received command.

If a "YES" state is satisfied at the judgement step 920, it means that the information accompanied by the received command includes an end code. When the end code is received, the processes following step 660 shown in FIG. 6 are executed. If a "NO" state is satisfied so that the process should not be terminated, the flow returns to the waiting loop at step 910.

In a conventional IC card, there has been used, e.g., a code $(OA)_{16}$ as the end code representative of the end of a command message. By using another code, e.g., $(OB)_{16}$ as the end code, it becomes possible to enter into the standby mode for all command messages without using a specific message for the standby command message.

In the above description of the embodiments, the reset signal has been used as the standby release signal. It is not limited only to the reset signal, but other signals for releasing a standby mode may also be used.

Furthermore, in the above embodiments, a handy terminal has been described by way of example. It is obvious that this invention is applicable to other external equipments such as various other terminals, and host computers.

According to the aspects illustrated in FIGS. 4 to 9, the IC card in the command waiting state is made of the standby state, and during the standby state, power is not supplied to MPU 1 and its peripheral circuits. The average power consumption of the IC card can therefore be reduced, and the handy terminal can drive the IC card for a long period with a small capacity battery. In addition, if the standby mode is allowed to be entered upon reception of a particular command after processing a consecutive series of command messages, it becomes possible to reduce the number of application times of the standby release signal such as reset signals which imposes a burden on the IC card.

Next, another embodiment will be described in accordance with the disclosure shown in FIGS. 10 to 14 wherein the power save operation of an IC card 20 is conducted by regulating the clock rate on the side of a handy terminal 30.

Figure 10:
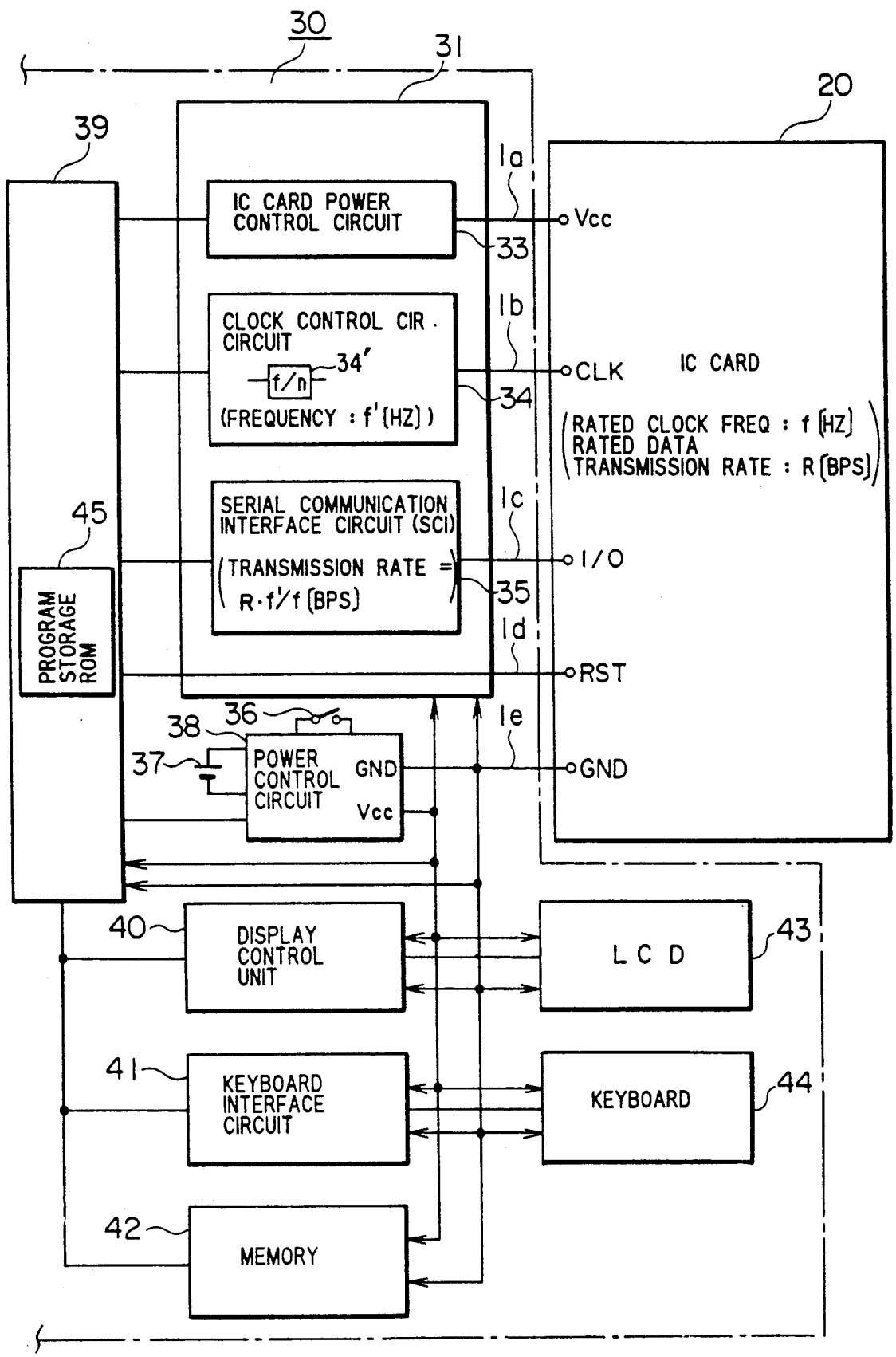
FIG. 10 is a block diagram showing the structure of the handy terminal according to another embodiment of this invention.
Figure 11:
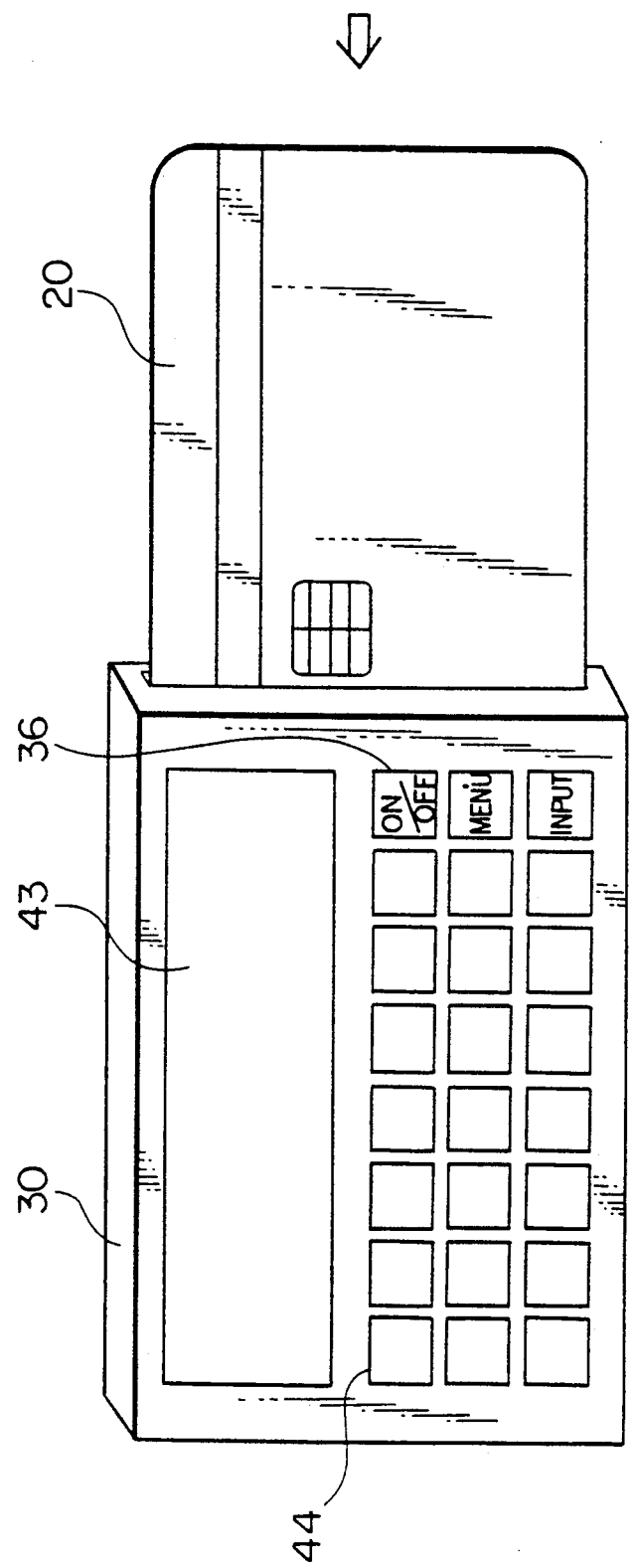
FIG. 11 shows the outline of a handy terminal and IC card loaded thereto.

Referring to FIG. 10, data are transferred between an IC card 20 and a handy terminal 30 to which the IC card 20 is loaded. The handy terminal 30 includes a microprocessor 39, IC card interface circuit 31 serving as an interface between the microprocessor 39 and IC card 20, power control circuit 38, display control circuit 40, keyboard interface circuit 41, and memory 42. A liquid crystal display (LCD) 43 is connected to the display control circuit 40, and a keyboard 44 to the keyboard interface circuit 41.

The power control circuit 38 is connected to a power switch 36 and battery 37. Power from the battery 37 is supplied to the above-described circuits constituting the handy terminal 30 upon turning-on of the power switch 36. Power from the battery 37 is also supplied to the IC card 20 via the IC card interface control circuit 31 under control of the microprocessor 39.

The IC card interface circuit 31 includes an IC card power control circuit 33 for supplying power to the IC card 20 in accordance with a control signal, a clock control circuit 34 for generating a clock signal of a rated clock frequency ($=f$) and a clock signal of a frequency ($=f'$), e.g., one eighth the rated clock frequency divided by means of a built-in frequency divider 34' which divides the frequency (f) into the frequency (f'), and a serial communication interface (SCI) 35 for converting parallel data from the microprocessor 39 into serial data for the supply to the IC card 20, or converting serial data from the IC card 20 into parallel data for the supply to the microprocessor 39.

SCI 35 is controlled by the microprocessor 39 and performs the data transfer to the IC card 20 at the reduced data transmission rate of ⅛ when the clock signal generated by the clock signal control circuit 34 becomes ⅛ of the rated clock frequency (i.e., $f'=f$). The display control circuit 40 is controlled by the microprocessor 39 so as to transfer the data received from the microprocessor or the like to LCD 43 to then display the corresponding information on LCD 43. The keyboard interface circuit 41 receives the information entered from the keyboard 44 and outputs the predetermined information to the microprocessor 39 by interrupting the microprocessor 39.

The operation of the handy terminal 30 constructed as above will be described below. Upon turning on the power switch 36, the power control circuit 38 starts operating so that power of a constant voltage is supplied from the battery 37 to the IC card interface circuit 31, display control circuit 40, keyboard interface circuit 41, memory 42, LCD 43, and keyboard 44. When the microprocessor 39 is powered, the predetermined program stored in a built-in program storage ROM 45 starts running. In accordance with this program, the microprocessor 39 controls the IC card interface circuit 31, display control circuit 40, keyboard interface circuit 41, memory 42, and power control circuit 38, to thereby execute an application process set in the handy terminal 30.

If an access request to the IC card 20 occurs during the course of executing the application process, the microprocessor 39 controls the IC card interface circuit 31 such that the IC card interface circuit 31 supplies power (source voltage Vcc) to the IC card 20 via a power supply signal line 1a, and a clock (CLK) via a clock supply line 1b. The microprocessor 39 also sets the reset signal ($\overline{RST}$) to be supplied via a control line 1d at high level ("H"), to thereby execute the transmission/reception of data via an I/O signal line 1c. Reference 1e denotes a ground (GND) signal line.

It is assumed that the IC card has a rated clock frequency of $f=4.9152$ MHz and rated data transmission rate of 9600 BPS according to the ISO standards. In this embodiment, a clock signal of a frequency $f'=614.40$ KHz, i.e., one eighth the rated clock frequency, is sent to the IC card 20 from the clock control circuit 34 including the frequency divider 34'.

Since the IC card 20 is standardized so as to perform the 9600 BPS data transmission process in accordance with the clock signal of 4.9152 MHz, the 9600 BPS data transmission rate is not possible if the received clock signal of 614.40 KHz is used.

In view of this, the microprocessor 39 controls SCI 35 so that data are transmitted at the transmission rate of 1200 BPS, i.e., $9600 \times (614.40 \times 10^3)/(4.9152 \times 10^6) = 1200$ BPS, which is one eighth the rated data transmission rate. It becomes therefore possible to transfer data between the IC card and handy terminal 30, while reducing the consumption current by the IC card as small as about one eighth and realizing a compact and light handy terminal 30 supplying power with a small capacity battery.

The above-described method does not sufficiently shorten the data transmission time if the handy terminal 30 writes into or reads from the IC card 20 a great amount of data at one time. In order to eliminate such disadvantage, the handy terminal 30 is adapted to operate in the manner shown in FIG. 12.

Figure 12:
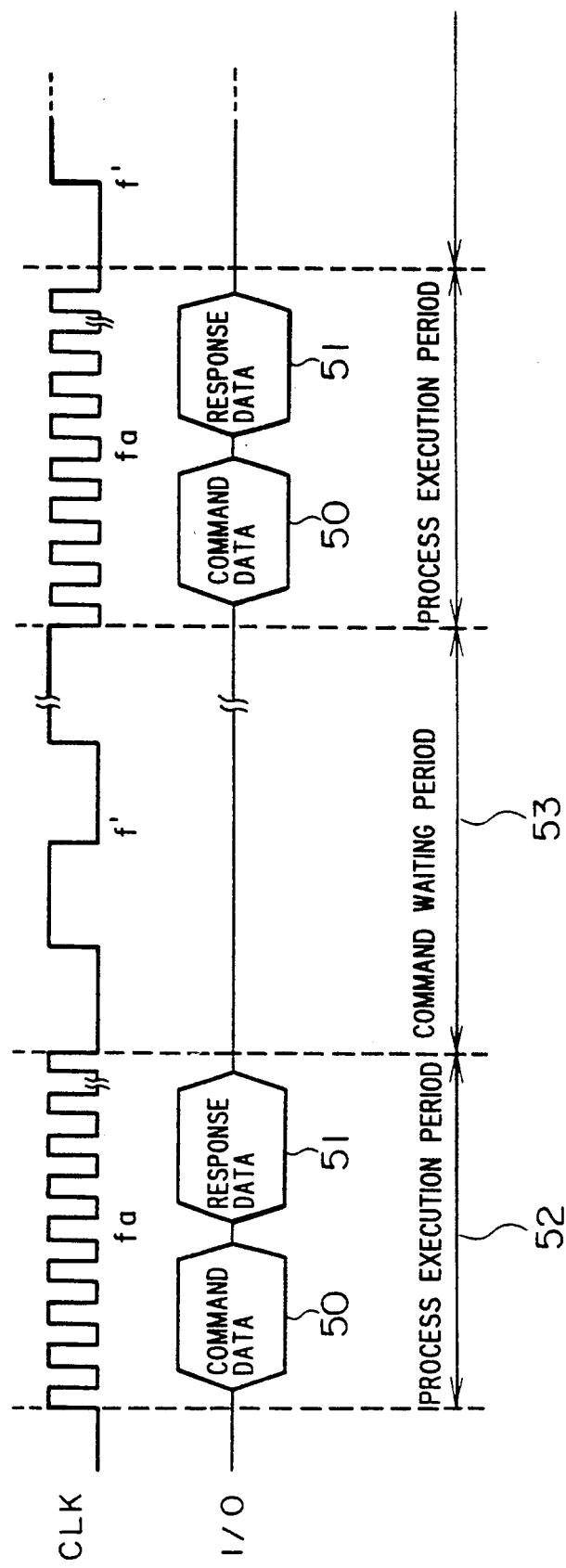
FIG. 12 is a timing chart showing the waveforms of the handy terminal shown in FIGS. 10 and 11.

FIG. 12 illustrates the relationship between the clock (CLK) sent from the handy terminal 30 to the IC card 20 and the transmitted data (I/O) between the handy terminal 30 and IC card 20.

The IC card 20 receives command data 50 from the handy terminal 30 and transmits back the response data 51. During the process execution period 52 while the IC card executes the process corresponding to the command 50, the handy terminal 30 supplies, from the frequency divider 34' of the clock control circuit 34 to the IC card 20, a clock of a frequency lower than the rated clock frequency, e.g., a clock frequency fa=2.4576 MHz half the rated clock frequency. Whereas during the command waiting period 53, a clock of a frequency f'=614.40 KHz is supplied from the clock control circuit 34 to the IC card 20. If the clock signal of the frequency 2.4576 MHz is supplied to the IC card 20 during the transmission/reception of the command data 50 and response data 51, the transmission rate at the handy terminal 30 becomes half the rated data transmission rate, i.e., $3600 \times (2.45676 \times 10^6)/(4.9152 \times 10^6) = 4800$ BPS.

The transmission/reception of the command data 50 and response data with respect to the IC card 20 is carried out in response to the key depression at the keyboard 44, so that the process execution time is very short as compared with the command waiting time. A great amount of data can therefore be processed at high speed with respect to the IC card while resulting in small average consumption current. Further, it is not necessary to turn off the power during the command waiting time, so that there is no fear of losing the information in a RAM of the IC card 20.

Figure 13:
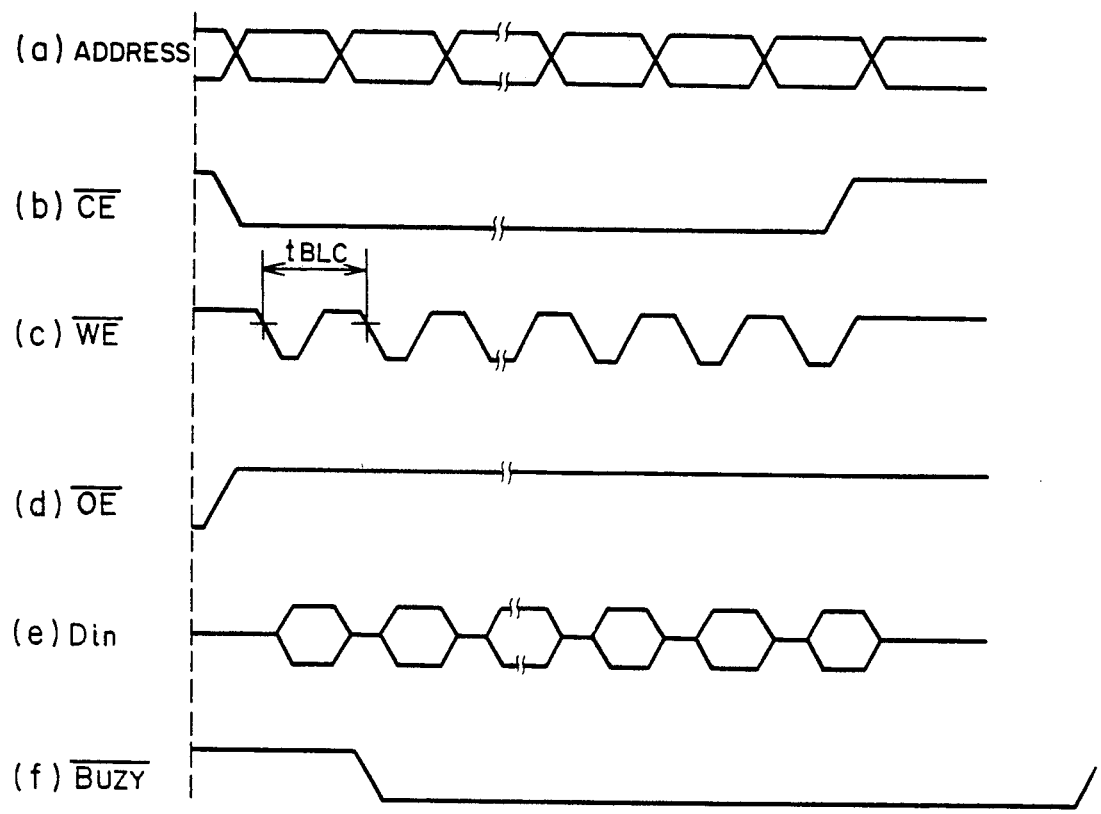
FIG. 13 is a timing chart showing an example of the data write process for the IC card.

Of IC cards 20 having therein an EEPROM chip, there is an IC card which has therein an oscillator for generating a data read/write operation sequence independently from the external clock. FIG. 13 is the timing chart illustrating the general write operation of an IC card having such an EEPROM.

Referring to FIG. 13, an address signal (Address) is indicated at (a). In writing data, first a chip enable signal ($\overline{CE}$) indicated at (b) is set at low level ("L") and an output enable signal ($\overline{OE}$) indicated at (d) is set at high level ("H"). Thereafter, address data (Din) are set and a write enable signal indicated at (c) is set at "L". The write data (Din) indicated at (e) can therefore be loaded. After loading the data and within 30 microseconds (=tBLC) after loading the first one byte data, data of 32 bytes can be written consecutively by setting each time the write enable signal at "L". The maximum value of 30 microseconds of the byte load cycle tBLC is determined by the oscillator within the LSI independently from the clock supplied to the IC card 20. Indicated at (e) in FIG. 13 is a busy signal (Busy).

In such a case, the write enable signal is controlled in accordance with the program of the microprocessor 39 within the IC card 20. The write enable signal therefore depends on the clock supplied to the IC card. Accordingly, if the frequency of the clock supplied to the IC card is lowered greatly, the write control signal cannot be controlled within the maximum value of the byte load cycle tBLC, resulting in a write error. The operation of controlling the clock which eliminates such disadvantage is illustrated in FIG. 14.

Figure 14:
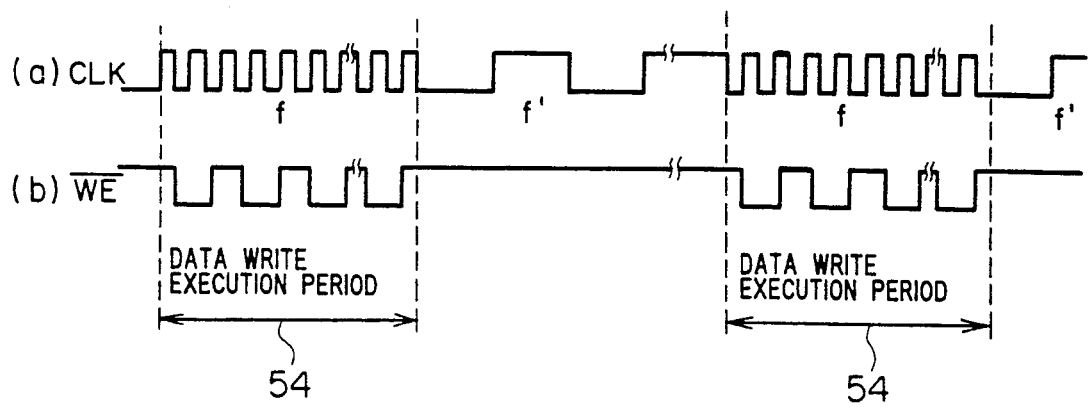
FIG. 14 is a timing chart showing the timings of data write.

As indicated at (b) in FIG. 14, the write enable signal ($\overline{WE}$) is controlled such that during the data write execution period 54, the clock signal of the rated clock frequency f (=4.9152 MHz) of the IC card is supplied as indicated at (a), and during the other period, the clock signal of a lower frequency f'(=614.40 KHz) is supplied. The data transmission rate is the rated one at the rated clock frequency f (=4.9152 MHz), and 1200 BPS at the clock frequency f'(=614.40 KHz). Since the write execution period of the IC card is shorter than the other IC card processing period, the average consumption current can be made small while preventing a write error.

In addition to the data erase/write operation with respect to an EEPROM of the IC card as described above, the control of lowering the clock frequency is also effectively applied to the case where there is any time restriction independent from the clock supplied to the IC card. The rated clock may be supplied for a longer period than the data write execution period of the EEPROM, e.g., the rated clock may be supplied during the execution of a command regarding a data erase/write.

The clock frequency as described with the embodiments is used by way of example only, and other frequencies may also be used with the same resultant advantageous effects. It is therefore obvious that the present invention is not limited to the above-described rated clock frequency and the clock frequency one eighth the rated clock frequency.

In the embodiment shown in FIGS. 10 to 19, there are provided means for supplying a clock frequency lower than the rated clock frequency of the IC card, and means for performing data communication at the data transmission rate lowered than the rated data transmission rate by the same ratio of the rated clock frequency of the IC card to the clock frequency supplied to the IC card. It is therefore possible to reduce the consumption current of the IC card without any data transmission trouble and make compact the portable IC card terminal.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. An IC card which operates in an operation mode and a sleep mode, during connection to external card reader/writer means which includes a power source for supplying power to the IC card and clock signal supply means for supplying a clock signal to the IC card, the IC card operating in the operation mode in accordance with command signals inputted from the external card reader/writer means and in the sleep mode in absence of receipt of the command signals, only selected peripheral circuits being maintained active to reduce power consumption of the power source, the IC card switching from the sleep mode to the operation mode in response to the command signals, the IC card comprising:

information processing means receiving the clock for processing information, supply of the clock signal to said information processing means being stopped and operation of the selected peripheral circuits continuing when the IC card enters the sleep mode; and release signal generating means for outputting a predetermined release signal to said information processing means to switch the IC card to the operation mode in response to receipt of the command signals from the external card reader/writer means, said information processing means executing processing corresponding to the command signals received from the external card reader/writer means after the IC card is switched to the operation mode, and returning the IC card to the sleep mode after executing the processing.

2. The IC card according to claim 1, wherein said information processing means is a microprocessor, the predetermined release signal is an interruption signal for said microprocessor, and said release signal generating means is a serial communication interface which generates the interruption signal in response to receipt of the command signals from the external card reader/writer means.

3. The IC card according to claim 2, further comprising a timer, coupled to said microprocessor and said serial communication interface, for setting a time defining a baud rate of said serial communication interface.

4. The IC card according to claim 1, further comprising an EEPROM for storing data for an application program.

5. A method of operating an IC card in an operation mode and a standby mode, during connection of the IC card to external card reader/writer means,
the external card reader/writer means including a power source for supplying power to the IC card and clock means for generating a clock signal for synchronizing operation of the IC card,
the IC card including an information processing unit for controlling peripheral circuits of the IC card,
the IC card being operable in the operation mode in accordance with command signals and the clock signal inputted from the external card reader/writer means and being operable in the standby mode in absence of receipt of the command signals from the external card reader/writer means wherein the clock signal supplied to the information processing unit and the peripheral circuits of the IC card is disabled while power supply is maintained, the method comprising the steps of:
initiating the standby mode after execution of processing corresponding to the command signals received from the external card reader/writer means; and
initiating the operation mode in response to a standby release signal sent from the external card reader/writer means to a reset terminal of the IC card.

6. The method of operating an IC card according to the claim 5, wherein transfer of the operation mode to the standby mode is carried out in response to a standby designation command sent from the portable external card reader/writer means.

7. The method of operating an IC card according to claim 5, wherein the IC card stores information indicative of whether the standby mode is allowed to be initiated after execution of processing corresponding to the command signals, the information being provided in one-to-one correspondence to each of a plurality of the command signals to be inputted from the portable external card reader/writer means,
the information is referred to in correspondence to the command signals sent from the portable external card reader/writer means, and when the information indicates the standby mode, the standby mode is initiated after executing the command signal.

8. The method of operating an IC card according to claim 7, wherein the information indicative of whether the standby mode is allowed to be initiated is stored as a standby setting program in an EEPROM within the IC card.

9. A terminal apparatus which performs data transfer relative to an IC card connectable to the terminal apparatus by supplying the IC card with power and sending to the IC card command signals for the execution of processes, the terminal apparatus comprising:
clock signal generating means for generating a clock signal f of a rated signal frequency f of the IC card and a clock signal f/n having a lower frequency than the rated clock signal frequency f card wherein n is a number greater than 1, the clock signal f/n being sent to the IC card for synchronizing operation thereof; and
interface means, coupled to said clock signal generating means, for transferring data between the IC card and the terminal apparatus synchronized with the clock signal f/n at a data transmission rate R/n which is lower than a rated data transmission rate R of the IC card.

10. The terminal apparatus of claim 9, wherein the terminal apparatus is portable.

11. The terminal apparatus of claim 9, further comprising battery means for supplying the IC card with power.

12. A method of operating an IC card at a reduced power rate during connection to terminal means, the IC card being operable in an operation mode and a sleep mode and comprising interface means for receiving command signals from the terminal means and internal clock generating means for generating an internal clock, power consumption of the IC card being reduced during the sleep mode, the method comprising the steps of:
processing information in the IC card in accordance with the command signals received from the terminal means when the IC card is in the operation mode;
transferring the IC card to the sleep mode upon completion of the processing in the operation mode, operation of the IC card other than the interface means and the internal clock generating means being disabled while supply of a voltage and a clock signal from the terminal means is maintained in absence of receipt of the command signals from the terminal means during the sleep mode; and
generating a release signal, in release signal generating means located on the IC card, in response to receipt of the command signals from the terminal means when in the sleep mode, to transfer the IC card to the operation mode.

13. The method of operating the IC card of claim 12, further comprising the steps of:
executing processing in the IC card in the operation mode based upon a command signal, which was received from the portable terminal means prior to generating the release signal.

14. A method of operating an IC card at a reduced power rate during connection to terminal means, the IC card being operable in an operation mode and a standby mode, power consumption of the IC card being reduced during the standby mode, the method comprising the steps of:

processing information in the IC card in accordance with command signals received from the terminal means when the IC card is in the operation mode;

transferring the IC card to the standby mode upon completion of the processing in the operation mode, operation of the IC card being disabled while supply of a voltage and a clock signal from the terminal means is maintained during the standby mode, to reduce power consumption; and transferring the IC card from the standby mode back to the operation mode in response to receipt of a standby release signal from the terminal means.

15. The method of operating the IC card of claim 14, further comprising the step of:

executing processing in the IC card in the operation mode based upon a command signal, which was received after receipt of the standby release signal.

16. The method of operating the IC card of claim 14, wherein the IC card stores information indicative of whether the standby mode is allowed to be initiated after execution of processing corresponding to the command signals, the information being provided in one-to-one correspondence to each of a plurality of the command signals to be inputted from the portable terminal means, the information being referred to in correspondence to the command signals sent from the portable terminal means, and when the information is indicative of the standby mode, the standby mode is initiated after execution of the command signals.

17. The method of operating the IC card of claim 16, wherein the information is stored as a standby setting program in an EEPROM within the IC card.

18. A terminal apparatus which performs data transfer relative to an IC card connectable to the terminal apparatus by supplying the IC card with power and sending to the IC card command signals for the execution of processes, the terminal apparatus comprising:

clock signal generating means for generating a clock signal f/n having a lower frequency than a rated clock signal frequency f of the IC card and a clock signal f/m having a lower frequency than the clock signal f/n wherein n and m are greater than 1 and m is greater than n; and interface means, coupled to said clock signal generating means, for transmitting the clock signal f/n and transferring data between the IC card and the terminal apparatus in synchronism with the clock signal f/n at a data transmission rate R/n which is lower than a rated data transmission rate R of the IC card, and transmitting the clock signal f/m to the IC card when the IC card enters a command waiting mode.

19. The terminal apparatus of claim 18, wherein the terminal apparatus is portable.

20. The terminal apparatus of claim 18, further comprising battery means for supplying the IC card with power.

21. An IC card operable in an operation mode and a standby mode during connection of the IC card to an external card reader/writer means, the IC card comprising:

information processing means for controlling peripheral circuits of the IC card; and storage means for storing a standby power bit indicative of whether or not the IC card has previously been initialized, the IC card being initialized in accordance with the standby power bit and operable in the operation mode in accordance with command signals and a clock signal inputted from the external card reader/writer means and being operable in the standby mode in absence of receipt of the command signals from the external card reader/writer means wherein supply of the clock signal to said information processing means and said peripheral circuits is disabled while supply of power from the external card reader/writer means is maintained.

22. A terminal apparatus which performs data transfer relative to an IC card connectable to the terminal apparatus by supplying the IC card with power and sending to the IC card command signals for the execution of processes, the terminal apparatus comprising:

clock signal generating means for generating a clock signal f equal to a rated clock signal frequency f of the IC card and a clock signal f/n having a frequency lower than the rated clock signal frequency f of the IC card wherein n is greater than 1, the terminal apparatus transmitting the clock signal f to the IC card when the IC card is in a command waiting mode and transmitting the clock signal f/n otherwise.

23. The terminal apparatus of claim 22, wherein the terminal apparatus is portable.

24. The terminal apparatus of claim 22, further comprising battery means for supplying the IC card with power.

* * * * *